United States Patent
Hosoya et al.

(10) Patent No.: US 9,365,735 B2
(45) Date of Patent: Jun. 14, 2016

(54) NON-AQUEOUS PIGMENT INK

(71) Applicant: RISO KAGAKU CORPORATION, Tokyo (JP)

(72) Inventors: Tetsuo Hosoya, Ibaraki (JP); Toshihiro Endo, Ibaraki (JP); Syotaro Kon, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/368,996

(22) PCT Filed: Dec. 19, 2012

(86) PCT No.: PCT/JP2012/008110
§ 371 (c)(1),
(2) Date: Jun. 26, 2014

(87) PCT Pub. No.: WO2013/099157
PCT Pub. Date: Jul. 4, 2013

(65) Prior Publication Data
US 2015/0005412 A1    Jan. 1, 2015

(30) Foreign Application Priority Data
Dec. 27, 2011  (JP) ................................. 2011-286002

(51) Int. Cl.
*C09D 11/326* (2014.01)
*C08F 220/18* (2006.01)
*C09D 11/36* (2014.01)
*C09D 11/324* (2014.01)

(52) U.S. Cl.
CPC ............ *C09D 11/326* (2013.01); *C08F 220/18* (2013.01); *C09D 11/324* (2013.01); *C09D 11/36* (2013.01); *C08F 2220/1891* (2013.01)

(58) Field of Classification Search
CPC .................................................. C09D 11/326
USPC ................................................. 523/160, 161
See application file for complete search history.

(56) References Cited

U.S. PATENT DOCUMENTS

| 2010/0136236 A1* | 6/2010 | Hosoya ............. C08G 18/0871 427/261 |
| 2011/0046298 A1 | 2/2011 | Hosoya et al. |
| 2012/0220702 A1 | 8/2012 | Hosoya et al. |

FOREIGN PATENT DOCUMENTS

| CN | 102015924 A | 4/2011 |
| JP | 2010-001452 A | 1/2010 |
| JP | 2011-127091 A | 6/2011 |
| JP | 2012-046595 A | 3/2012 |
| WO | WO 2009/142075 | * 11/2009 |

OTHER PUBLICATIONS

International Search Report issued in corresponding International Application No. PCT/JP2012/008110; Dated Apr. 2, 2013 (3 pages).
Written Opinion of the International Searching Authority issued in PCT/JP2012/008110 mailed on Apr. 2, 2013 (5 pages).
Office Action issued in corresponding Chinese Patent Application No. 201280064324.0, dated Mar. 16, 2015 (14 pages).
Extended European search report issued Jul. 15, 2015 in corresponding European applicaiton No. 12861652.1 (6 pages).

* cited by examiner

*Primary Examiner* — Doris Lee
(74) *Attorney, Agent, or Firm* — Greenblum & Bernstein, P.L.C.

(57) ABSTRACT

In a non-aqueous pigment ink that includes pigment, a non-aqueous solvent, and a non-aqueous resin that functions to disperse pigment dissolved in the non-aqueous solvent, the non-aqueous solvent includes a hydrocarbon based non polar solvent at 50% by mass or more with respect to the total amount of solvent. The non-aqueous resin is an acrylic polymer having a comb shaped structure, in which alkyl groups having carbon numbers from 8 to 18 and urethane groups form side chains on a (meth)acrylate main chain. The acrylic polymer is a copolymer of an alkyl(meth)acrylate (A) having alkyl groups with a carbon number from 8 to 18, a reactive (meth)acrylate (B) having functional groups that react with amino groups, and a monomer (C) having β-diketone groups or β-keto acid ester groups, into which the urethane groups are introduced by reactions between the functional groups that react with amino groups, amino alcohol, and a multivalent isocyanate compound. The mass ratio between the copolymer moiety and the urethane group moiety in the acrylic polymer is from 80:20 to 99:1.

8 Claims, No Drawings

NON-AQUEOUS PIGMENT INK

TECHNICAL FIELD

The present invention relates to a non-aqueous pigment ink that is suitable for use with an inkjet recording device, and in particular to a non-aqueous pigment ink that is capable of contributing to conservation of electricity, and has superior low temperature adaptability.

RELATED ART

The inkjet recording method ejects a highly fluid inkjet ink as ink particles from very fine head nozzles to record images on recording media, which are positioned to face the nozzles. Due to low noise and high-speed printing ability, the inkjet recording method has rapidly been becoming widely used recently. As inks for use in the inkjet recording method, so called non-aqueous pigment inks, which are formed by finely dispersing pigment in non water soluble solvents, are known.

In recent years, it is desired to reduce the power consumption of devices, such as printers, to be as low as possible from the viewpoints of resources, the environment, and conservation of energy. Therefore, there are ever increasing demands for power efficiency in the field of inkjet printing as well, in order to conserve electricity. In an ink jet recording device, ink in an ink chamber provided in an inkjet head is ejected from a nozzle when pressure is applied to the ink chamber. The ink ejected from the nozzle flies while leaving a tail behind it, and there is a time difference and a velocity difference between the leading part and the trailing part of the flying ink. In a low temperature environment, the viscosity of the ink increases, and therefore it is necessary to apply a higher driving voltage to the inkjet head to eject a desired amount of ink. Further, ejecting ink with the higher driving voltage causes the tails of ink droplets ejected from the nozzle to become long. Long tails break off easily, and such broken off tails lead to satellites being generated. The satellites are deposited on a recording medium and degrade the print quality, or become deposited within the ink jet recording device and contaminate the device. For this reason, conventionally, recording operations are started after a warm up operation to warm the inkjet head is performed, in low temperature environments, in which satellites are likely to be generated.

That is, in a low temperature environment where the satellites are likely to be generated, recording operations are started after the warm up operation. Therefore, a long amount of time is required to record images. Accordingly, if the generation of satellites can be suppressed in the ink, such suppression would be effective in conserving electricity. Decreasing the viscosity of ink is extremely effective as a means of suppressing the generation of satellites. In order to decrease the viscosity of ink, it is effective to reduce the amount of colorant or the amount of powder in the ink. However, reduction of the amount of colorant or the amount of powder in the ink will lead to lower print density, resulting in a problem that image quality will deteriorate.

From a different viewpoint, it is possible to decrease the viscosity of ink by employing a hydrocarbon based low viscosity non polar solvent having a high boiling point (hereinafter, referred to simply as "hydrocarbon based non polar solvent"). The polarity of an ink solvent is changed by employing a hydrocarbon based non polar solvent as the ink solvent, which may lead to deterioration in pigment dispersion stability. However, it is considered that such a shortcoming can be overcome by changing the composition of a dispersing agent. The present applicant has proposed a non-aqueous pigment ink that includes fine non-aqueous resin dispersing particles having a pigment dispersing ability, in Patent Document 1.

RELATED ART DOCUMENTS

Patent Documents

[Patent Document 1]
 Japanese Unexamined Patent Publication No. 2010-001452

DISCLOSURE OF THE INVENTION

However, the carbon numbers of alkyl groups are generally high in hydrocarbon based non polar solvents, and there is a large amount of steric hindrance. Therefore, it is difficult for the fine non-aqueous resin dispersing particles disclosed in Patent Document 1 to adsorb to pigment, and not only can pigment dispersing properties not be secured, but it cannot be said that the solubility within the hydrocarbon based non polar solvent is sufficient. Meanwhile, it is necessary for the affinity between a hydrocarbon based non polar solvent and pigment to be high in order to achieve pigment dispersing properties. However, if the affinity is excessively high, there is a tendency for the pigment to get absorbed into recording media when the hydrocarbon based non polar solvent permeates into the recording media. As a result, printing density will become low, and print bleed through becomes likely to occur.

The present invention has been developed in view of the foregoing circumstances. It is an object of the present invention to provide a non-aqueous pigment ink which is capable of contributing to conservation of electricity, is superior in low temperature adaptability and storage stability (pigment dispersion stability), and can suppress print bleed through at the same time, thereby realizing high print density.

A non-aqueous pigment ink of the present invention includes: a pigment, a non-aqueous solvent, and a non-aqueous resin that dissolves in the non-aqueous solvent and has a pigment dispersing ability;

the non-aqueous solvent including a hydrocarbon based non polar solvent at 50% by mass or more with respect to the total amount of solvent;

the non-aqueous resin being an acrylic series polymer having a comb shaped structure, in which alkyl groups having carbon numbers within a range from 8 to 18 and urethane groups form side chains on a (meth)acrylate main chain;

the acrylic series polymer being a copolymer of an alkyl (meth)acrylate (A) having alkyl groups with a carbon number within a range from 8 to 18, a reactive (meth)acrylate (B) having functional groups that react with amino groups, and a monomer (C) having one of β-diketone groups and β-keto acid ester groups, into which the urethane groups are introduced by reactions between the functional groups that react with amino groups, amino alcohol, and a multivalent isocyanate compound; and the mass ratio between the copolymer moiety and the urethane group moiety in the acrylic series polymer being within a range from 80:20 to 99:1.

It is preferable for the carbon number of the alkyl groups that form the side chains to be within a range from 12 to 18.

It is preferable for the mass ratio between the copolymer moiety and the urethane group moiety in the acrylic series polymer to be within a range from 85:15 to 95:5.

It is preferable for the non-aqueous solvent to include the hydrocarbon based non polar solvent at 70% by mass or greater with respect to the total amount of the solvent.

A pigment dispersing agent for non-aqueous pigment ink of the present invention is an acrylic series polymer having a comb shaped structure, comprising a (meth)acrylate main chain and alkyl groups having carbon numbers within a range from 8 to 18 and urethane groups that form side chains on the (meth)acrylate main chain;

the acrylic series polymer being a copolymer of an alkyl (meth)acrylate (A) having alkyl groups with a carbon number within a range from 8 to 18, a reactive (meth)acrylate (B) having functional groups that react with amino groups, and a monomer (C) having one of β-diketone groups and β-keto acid ester groups, into which the urethane groups are introduced by reactions between the functional groups that react with amino groups, amino alcohol, and a multivalent isocyanate compound; and the mass ratio between the copolymer moiety and the urethane group moiety in the acrylic series polymer being within a range from 80:20 to 99:1.

The non-aqueous pigment ink of the present invention includes the non-aqueous solvent that includes a hydrocarbon based non polar solvent at 50% by mass or more with respect to the total amount of solvent. The non-aqueous resin is an acrylic series polymer having a comb shaped structure, in which alkyl groups having carbon numbers within a range from 8 to 18 and urethane groups form side chains on a (meth)acrylate main chain. The acrylic series polymer is a copolymer of an alkyl(meth)acrylate (A) having alkyl groups with a carbon number within a range from 8 to 18, a reactive (meth)acrylate (B) having functional groups that react with amino groups, and a monomer (C) having one of β-diketone groups and β-keto acid ester groups, into which the urethane groups are introduced by reactions between the functional groups that react with amino groups, amino alcohol, and a multivalent isocyanate compound. The mass ratio between the copolymer moiety and the urethane group moiety in the acrylic series polymer is within a range from 80:20 to 99:1. Therefore, print bleed through can be suppressed and high printing density can be realized, while securing low temperature adaptability and pigment dispersion stability.

BEST MODE FOR CARRYING OUT THE INVENTION

A non-aqueous pigment ink (which may hereinafter simply be referred to as "ink") of the invention is an ink that includes pigment, a non-aqueous solvent, and a non-aqueous resin that dissolves in the non-aqueous solvent and has a pigment dispersing ability.

The non-aqueous resin is an acrylic series polymer having a comb shaped structure, in which alkyl groups having carbon numbers within a range from 8 to 18 and urethane groups form side chains on a (meth)acrylate main chain. Here, "(meth)acrylate" refers to both acrylate and methacrylate. The acrylic series polymer is a copolymer of an alkyl(meth) acrylate (A) having alkyl groups with a carbon number within a range from 8 to 18, a reactive (meth)acrylate (B) having functional groups that react with amino groups, and a monomer (C) having one of β-diketone groups and β-keto acid ester groups, into which the urethane groups are introduced by reactions between the functional groups that react with amino groups, amino alcohol, and a multivalent isocyanate compound.

It is necessary for a desirable dispersing agent for an ink to be present in the ink in a dissolved state, that is, to be present in the ink not as dispersed particles. In the non-aqueous resin of the present invention, the alkyl groups having carbon numbers within a range from 8 to 18 that form the side chains is highly compatible with a hydrocarbon based non polar solvent in the non-aqueous solvent to be described later. Thereby, the non-aqueous resin will be in a dissolved state within the non-aqueous solvent, and the urethane groups, which are the other side chains, adsorb to the pigment, enabling stable dispersion of the pigment, and improving storage stability. If the carbon number of the alkyl groups is 19 or greater, the non-aqueous resin will become likely to solidify at low temperatures, and the low temperature adaptability of the ink will deteriorate. Meanwhile, if the carbon number is 7 or less, the compatibility with the hydrocarbon based non polar solvent will decrease, and storage stability will deteriorate, because the pigment cannot be stably dispersed, and the viscosity of the ink will also increase. The viscosity of the ink will become even higher in low temperature environments, and low temperature adaptability will become poor. A more desirable range for the carbon number of the alkyl groups is a range from 12 to 18.

The alkyl groups having a carbon number within a range from 8 to 18 that form the side chains may be linear or branched. Specific examples of the alkyl groups include octyl groups, nonyl groups, decyl groups, dodecyl groups, tridecyl groups, tetradecyl groups, pentadecyl groups, hexadecyl groups, heptadecyl groups and octadecyl groups. A plurality of types of the alkyl groups may be included.

The urethane groups that form the side chains are those that have carbamic acid ester ($H_2NCOOR$, $RNHCOOR$) portions.

The molecular weight (mass average molecular weight) of the acrylic polymer is not particularly limited. However, if the ink of the present invention is to be used as an inkjet ink, it is preferable for the molecular weight to be within a range from about 5,000 to about 50,000, and more preferably in the range from about 10,000 to about 30,000 from the viewpoint of ejection properties of the ink.

The glass transition temperature (Tg) of the acrylic polymer is preferably room temperature or less, and more preferably 0° C. or less. With the glass transition temperature in this range, film formation can be promoted at room temperature when the ink is fixed on a recording medium.

The alkyl(meth)acrylate (A) is an alkyl(meth)acrylate including an alkyl group having a carbon number within a range from 8 to 18, and forms the (meth)acrylate main chain of the non-aqueous resin, while at the same time, the alkyl groups constitute the side chains. Preferred examples of the alkyl(meth)acrylate (A) include palmityl/stearyl methacrylate (C16/C18), cetyl acrylate (C16), dodecyl methacrylate (C12), dodecyl acrylate (C12), 2-ethylhexyl methacrylate (C8) and 2-ethylhexyl acrylate (C8), which may be used singly or in appropriate combinations.

The reactive (meth)acrylate (B) is a (meth)acrylate that has functional groups capable of reacting with amino groups, and forms the (meth)acrylate main chain of the non-aqueous resin and also constitutes the side chains by urethane groups which are introduced by reactions between the functional groups that react with amino groups, amino alcohol, and a multivalent isocyanate compound. Preferred examples of the functional groups of the reactive (meth)acrylate (B) which are capable of reacting with amino groups include glycidyl groups, vinyl groups, and (meth)acryloyl groups.

Glycidyl(meth)acrylate is an example of the (meth)acrylate including a glycidyl group, and preferred examples of the (meth)acrylate (B) including a vinyl group include vinyl (meth)acrylate and 2-(2-vinyloxyethoxy)ethyl(meth)acrylate. Examples of the reactive (meth)acrylate that includes a (meth)acryloyl group include dipropylene glycol di(meth) acrylate and 1,6-hexanediol di(meth)acrylate. A plurality of types of the reactive (meth)acrylate (B) may be included.

Preferred examples of the monomer (C) include a (meth) acrylate and a (meth)acrylamide which include β-diketone groups or β-keto acid ester groups. The monomer (C) forms the (meth)acrylate main chain of the non-aqueous resin, and the β-diketone groups or the β-keto acid ester groups constitute the side chains. The viscosity of the ink can be decreased by the ink including the monomer (C), and low temperature adaptability will be improved. In addition, the suppression of an increase in viscosity contributes to electrostatic agglomeration and fixation of ink when the ink lands on recording media. As a result, printing density is improved, and suppression of print bleed through can be realized.

Preferred examples of the β-diketone groups of the monomer (C) include acetoacetyl groups and propionacetyl groups. Preferred examples of the β-keto acid ester groups include acetoacetoxy groups and propionacetoxy groups.

Preferred examples of the monomer (C) include (meth) acrylate and (meth)acrylamide that include β-diketone groups or β-keto acid groups in the ester chains thereof. More specific examples include acetoacetoxy alkyl(meth)acrylates, such as acetoacetoxy ethyl(meth)acrylate, and acetoacetoxy alkyl(meth)acrylamides, such as hexadione(meth) acrylate and acetoacetoxy ethyl(meth)acrylamide. These may be employed either singly, or combinations of two or more types of the acetoacetoxy alkyl(meth)acrylates and acetoacetoxy alkyl(meth)acrylamides may be employed.

The content of the alkyl(meth)acrylate (A) in the monomer mixture described above is preferably 30% by mass or greater, more preferably within a range from 40% to 95% by mass, and even more preferably within a range from 50% to 90% by mass. The content of the reactive (meth)acrylate (B) in the monomer mixture is preferably within a range from 1% to 30% by mass, and more preferably within a range from 3% to 25% by mass. The content of the monomer (C) is preferably within a range from 3% to 30% by mass, and more preferably within a range from 5% to 20% by mass.

The monomers described above can be easily polymerized by radical copolymerization, which is a known polymerization method. It is preferable for the reaction system to be solution polymerization or dispersion polymerization. In this case, in order to achieve the molecular weight of the acrylic polymer within a preferred range to be described later after the polymerization, it is effective to employ a chain transfer agent during polymerization. Examples of the chain transfer agent include thiols, such as n-butyl mercaptan, lauryl mercaptan, stearyl mercaptan, and cyclohexyl mercaptan.

A known thermal polymerization initiator, such as an azo compound such as AIBN (azobisisobutyronitrile) or a peroxide (such as t-butyl peroxybenzoate, t-butyl peroxy-2-ethylhexanoate (PERBUTYL O, by NOF Corporation)) may be used as a polymerization initiator. Alternatively, a photopolymerization initiator, which generates radicals when exposed to an active energy ray, may be employed. A petroleum solvent (aroma-free (AF)), etc., may be used as a polymerization solvent used in solution polymerization. It is preferable to select one or more solvents which are usable as the non-aqueous solvent in the ink (which will be described later) as the polymerization solvent. For the polymerization reaction, other agents which are generally employed in polymerization, such as a polymerization inhibitor, a polymerization promoter, a dispersing agent, etc., may be added to the reaction system.

Amino alcohol reacts with and binds to the functional groups capable of reacting with amino groups derived from the reactive (meth)acrylate (B) of the obtained copolymer, and an addition reaction between a hydroxy group of the amino alcohol and an isocyanate ester group ($R^1N=C=O$) of a multivalent isocyanate compound occurs as shown below, to introduce the urethane groups (urethane bonds) (carbamic acid ester: $R^1NHCOOR$) are introduced. Here, R-represents amino alcohol moieties which are bound to the functional groups of the copolymer.

$$R^1N=C=O+R-OH \rightarrow ROCONHR^1$$

Thereby, urethane groups that function as pigment adsorbing groups are introduced to the copolymer, which does not have pigment adsorbing ability.

Examples of the amino alcohol include monomethyl ethanolamine, diethanolamine and diisopropanolamine. Among them, dialkanolamine (secondary alkanolamine) represented by the general formula: $(HOR)_2NH$ (wherein R is a divalent hydrocarbon group), which provides two hydroxy groups to form a greater number of urethane groups, is preferable. A plurality of these amino alcohols may be used in combination.

From the viewpoint of introducing an appropriate number of urethane groups, it is preferable for the amount of the amino alcohol to be reacted to be 0.05 to 1 molar equivalent, and more preferably 0.1 to 1 molar equivalent with respect to the functional groups of the reactive (meth)acrylate (B) capable of reacting with amino groups. When the amount of the amino alcohol is less than 1 molar equivalent, unreacted functional groups of the (meth)acrylate (B) having functional groups capable of reacting with amino groups will remain. However, it is believed that the unreacted functional groups function as pigment adsorbing groups.

Examples of the multivalent isocyanate compound include aliphatic, alicyclic and aromatic compounds, such as 1,6-diisocyanate hexane, 1,3-bis(isocyanatemethyl)benzene, 1,3-bis(isocyanatemethyl)cyclohexane and 1,5-naphthalene diisocyanate, which may be used in combinations of two or more. It is preferable for the amount of the multivalent isocyanate compound to be reacted to be approximately equivalent (0.98 to 1.02 molar equivalent) to the amount of hydroxy groups included in prepared raw materials, such that no unreacted raw materials are left when the urethane groups are introduced through the reaction with the hydroxy groups.

It is preferable for the mass ratio between the copolymer moieties and the introduced urethane group moieties of the acrylic polymer to be within a range from 80:20 to 99:1, and more preferably within a range from 85:15 to 95:5. The mass of the copolymer moieties of the acrylic polymer refers to the total mass of the monomers used in the copolymerization, and the mass of the introduced urethane group moieties refers to the total mass of the amino alcohol and the multivalent isocyanate compound used in the reaction. The urethane group moieties adsorb pigment. Therefore, although it may be considered that a higher mass ratio of the urethane group moieties results in a higher pigment adsorption rate, a mass ratio of the urethane group moieties higher than 20 results in poor compatibility with the solvent. This leads to the amount of free non-aqueous resin increasing, resulting in a lower pigment adsorption rate.

The content of the non-aqueous resin with respect to the total amount of the ink is preferably 0.1% by mass or greater, and more preferably 2% by mass or greater, from the viewpoint of securing pigment dispersing properties. If the content of the non-aqueous resin is excessively high, not only will the ink viscosity increase, but there is a possibility that storage stability in a high temperature environment will deteriorate. Therefore, the content of the non-aqueous resin is preferably 20% by mass or less, and more preferably 10% by mass or less. Further, the content of the non-aqueous resin with respect to the total amount of ink is preferably within a range from 3 to 8% by mass.

It is preferable for the mass of the non-aqueous resin (the total amount of resin in the case that resins other than the non-aqueous resin are also included) with respect to the mass of the pigment to be 0.5 or greater when the mass of the pigment is designated as 1, from the viewpoint of securing pigment dispersing ability. In addition, it is preferable for the mass of the non-aqueous resin with respect to the pigment to be 1 or greater when the mass of the pigment is designated as 1, from the viewpoint of improving the viscosity of the ink and to avoid ejection failure due to changes over time.

In the case that ink is for use in an inkjet recording system, a suitable range of ink viscosity varies depending on the nozzle diameter of the ejection head, the ejection environment, etc. However, it is generally preferable for the viscosity of ink to be within a range from 5 to 30 mPa·s at 23° C., more preferably within a range from 5 to 15 mPa·s, and an ink viscosity of about 10 mPa·s at 23° C. is suitable for use with an inkjet recording device. Here, the viscosity is a value at a shear stress of 10 Pa when the shear stress is increased from 0 Pa at a rate of 0.1 Pa/s at 23° C.

The acrylic polymer non-aqueous resin having a comb structure in which alkyl groups having a carbon number within the range from 8 to 18 and urethane groups form side chains on a (meth)acrylate main chain is obtained in the manner described above. The side chains formed by the alkyl groups having a carbon number within the range from 8 to 18 improve the affinity with a hydrocarbon based non polar solvent of a non-aqueous solvent to be described later, and solubility with respect to the solvent is secured. Meanwhile, the side chains formed by the urethane groups adsorb the pigment, to improve storage stability.

The non-aqueous resin described above can be favorably employed as a pigment dispersing agent for non-aqueous pigment ink.

The non-aqueous solvent includes the hydrocarbon based non polar solvent at 50% by mass or greater with respect to the total amount of solvent, preferably at 70% by mass or greater, and more preferably at 85% by mass or greater. In the case that the amount of the hydrocarbon based non polar solvent is less than 50% by mass with respect to the total amount of solvent, the viscosity of the ink cannot be sufficiently decreased. Preferred examples of the hydrocarbon based non polar solvent include an aliphatic hydrocarbon solvent, an alicyclic hydrocarbon-based solvent and an aromatic hydrocarbon solvent. Preferred examples of the aliphatic hydrocarbon solvent and the alicyclic hydrocarbon-based solvent include: TECLEAN N-16, TECLEAN N-20, TECLEAN N-22, NISSEKI NAPHTESOL L, NISSEKI NAPHTESOL M, NISSEKI NAPHTESOL H, NO. 0 SOLVENT L, NO. 0 SOLVENT M, NO. 0 SOLVENT H, NISSEKI ISOSOL 300, NISSEKI ISOSOL 400, AF-4, AF-5, AF-6 and AF-7 by JX Nippon Oil & Energy Corporation; and Isopar G, Isopar H, Isopar L, Isopar M, Exxsol D40, Exxsol D80, Exxsol D100, Exxsol D130, and Exxsol D140 by Exxon. Preferred examples of the aromatic hydrocarbon solvent include NISSEKI CLEANSOL G (alkyl benzene) by JX Nippon Oil & Energy Corporation, and SOLVESSO 200 by Exxon.

Polar solvents such as an ester solvent, an alcohol solvent, a higher fatty acid solvent, or an ether solvent may be employed as solvents other than the hydrocarbon based non polar solvent. More specifically, an ester solvent with a carbon number of 14 or greater per molecule, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylol propane tri-2-ethylhexanoate, glyceryl tri-2-ethylhexanoate, etc.; an alcohol solvent with a carbon number of 12 or greater per molecule, such as isomyristyl alcohol, isopalmityl alcohol, isostearyl alcohol, oleyl alcohol, etc.; a higher fatty acid solvent, such as isononanoic acid, isomyristic acid, hexadecane acid, isopalmitic acid, oleic acid, isostearic acid, etc.; or an ether solvent, such as diethylglycol monobutylether, ethylene glycol monobutylether, propylene glycol monobutylether, propylene glycol dibutylether, etc., may preferably used. These non-aqueous solvents may be used singly or in combinations of two or more.

Examples of the pigment include: carbon blacks, such as Furnace Black, Lamp Black, Acetylene Black, Channel Black, etc.; metals or metal oxides, such as copper, iron, titanium oxide, etc.; and organic pigments, such as Ortho Nitro Aniline Black, etc. These pigments may be used singly or in an appropriate combination. Examples of the pigments for color inks include Toluidine Red, Permanent Carmine FB, Disazo Orange PMP, Lake Red C, Brilliant Carmine 6B, Quinacridone Red, Dioxane Violet, Orthonitro Aniline Orange, Dinitro Aniline Orange, Vulcan Orange, Chlorinated Para Red, Brilliant Fast Scarlet, Naphthol Red 23, Pyrazolone Red, Barium Red 2B, Calcium Red 2B, Strontium Red 2B, Manganese Red 2B, Barium Lithol Red, Pigment Scarlet 3B Lake, Lake Bordeaux 10B, Anthocin 3B Lake, Anthocin 5B Lake, Rhodamine 6G Lake, Eosin Lake, Ferric Oxide Red, Naphthol Red FGR, Rhodamine B Lake, Methyl Violet Lake, Dioxazine Violet, Naphthol Carmine FB, Naphthol Red M, Fast Yellow AAA, Fast Yellow 10G, Disazo Yellow AAMX, Disazo Yellow AAOT, Disazo Yellow AAOA, Disazo Yellow HR, Isoindoline Yellow, Fast Yellow G, Disazo Yellow AAA, Phthalocyanine Blue, Victoria Pure Blue, Basic Blue 5B Lake, Basic Blue 6G Lake, Fast Sky Blue, Alkali Blue R Toner, Peacock Blue Lake, Iron Blue, Ultramarine, Reflex Blue 2G, Reflex Blue R, Alkali Blue G Toner, Brilliant Green Lake, Diamond Green Thioflavin Lake, Phthalocyanine Green G, Green Gold, Phthalocyanine Green Y, iron oxide powder, rust powder, zinc white, titanium oxide, calcium carbonate, clay, barium sulfate, alumina white, aluminum powder, bronze powder, daylight fluorescent pigments, pearl pigments, etc. These pigments may be used singly or as appropriate mixtures.

It is preferable for the average dispersed particle size of the pigment to be 300 nm or less, more preferably 150 nm or less, and even more preferably 100 nm or less, from the viewpoint of ejection stability and preservation stability.

The content of the pigment in the ink is usually in the range from 0.01 to 20% by mass. It is preferable for the content of the pigment in the ink to be within a range from 1 to 15% by mass, and more preferably within a range from 5 to 10% by mass, from the viewpoint of print density and ink viscosity.

In addition to the components listed above, the ink of the present invention may include conventional additives. Examples of the additives may include a surfactant, such as an anionic, cationic, amphoteric or nonionic surfactant, an antioxidant, such as dibutylhydroxytoluene, propyl gallate, tocopherol, butylhydroxyanisol or nordihydroguaiaretic acid, etc.

The ink of the present invention is prepared by synthesizing the non-aqueous resin in the manner described above, then supplying all of the components at once to a known dispersing device such as a bead mill, or by dividing the components and supplying them sequentially to a dispersing device, performing dispersion, and by passing the components through a known filter such as a membrane filter if desired.

EXAMPLES

Synthesis of Copolymer a-1

75 g of AF-7 (naphthenic solvent, by JX Nippon Oil & Energy Corporation) was placed in a 300 ml four necked flask, and the temperature was raised to 110° C. while introducing nitrogen gas and stirring. Next, while maintaining the temperature at 110° C., a mixture of 16.7 g of AF-7 and 2 g of PERBUTYL O (t-butylperoxy-2-ethylhexanoate, by NOF Corporation) was dripped over three hours into each of a plurality of monomer mixtures having the compositions shown in Table 1. Then, while maintaining the temperature at 110° C., 0.2 g of PERBUTYL O was added one hour later and two hours later, respectively. The mixtures were left to mature at 110° C. for one hour, and then were diluted with 10.6 g of AF-7 to obtain colorless and transparent copolymers a-1 with a non-volatile content of 50%. The resulting copolymers had mass average molecular weights within a range from 20,000 to 23,000 (measured according to the GPC method, converted into standard polystyrene).

TABLE 1

| | Copolymer | | a | b | c | d | e | f | g | h | i | j | k | l |
|---|---|---|---|---|---|---|---|---|---|---|---|---|---|---|
| Monomer Mixture | VMA (C22) | Behenyl methacrylate (NOF Corporation) | | | | | | | 70 | | | | | |
| | PSMA (C16/C18) | Palmityl/stearyl methacrylate (Kao Corporation) | 50 | 50 | 50 | 50 | 50 | 50 | | | | | 50 | 50 |
| | LMA (C12) | Dodecyl methacrylate (Kao Corporation) | 20 | | 34 | 10 | 30 | 10 | | 70 | | | 35 | 35 |
| | EHMA (C8) | 2-ethylhexyl methacrylate (Mitsubishi Chemical Corporation) | | 20 | | | | | | | 70 | | | |
| | HMA (C6) | Hexyl methacrylate | | | | | | | | | | 70 | | |
| | AHEM | Acetoacetoxy ethylmethacrylate (The Nippon Synthetic Chemical Industry Co., Ltd.) | 15 | 15 | 15 | 15 | 5 | 25 | 15 | 15 | 15 | 15 | 0 | 15 |
| | GMA | Glycidyl methacrylate (NOF Corporation) | 15 | 15 | 1 | 25 | 15 | 15 | 15 | 15 | 15 | 15 | 15 | 0 |

(Preparation of Pigment Dispersing Agent)

200 g of the solution of copolymer a (with a solid content of 50% in the AF-7 solvent), 4.0 g of a Michael adduct (diethanolamine/2-ethylhexyl acrylate adduct), and 2.8 g of diethanolamine (by Nippon Shokubai Co., Ltd.) were placed in a four necked 500 ml flask, and the temperature was raised to 110° C. while introducing nitrogen gas and stirring. Then, a reaction between the glycidyl groups of the solution of copolymer a and diethanolamine was completed by maintaining the temperature at 110° C. for one hour. Then, 0.2 g of dibutyl tin dilaurate was added, and a mixture of 7.8 g of TAKENATE 600 (1,3-bis(isocyanatemethyl)cyclohexane, by Mitsui Chemicals Polyurethanes, Inc.) and 72.0 g of EXEPARL HL (hexyl laurate, by Kao Corporation) was dripped over one hour. After the dripping, the temperature was raised to 120° C. to cause the mixture to react for six hours, and then the mixture was cooled to obtain a pigment dispersing agent D1 with a solid content of 40%.

Pigment dispersing agents D2 through D14 having the compositions shown in Table 2 were prepared in a similar manner. The solid content of all of the copolymers shown in Table 2 is 50%. The obtained acrylic polymers had mass average molecular weights in the range from 22,000 to 26,000 (measured according to the GPC method, converted into standard polystyrene).

| | | | D1 | D2 | D3 | D4 | D5 | D6 | D7 |
|---|---|---|---|---|---|---|---|---|---|
| | Long Chain Alkyl Groups (Carbon Numbers) | | 16/18/12 | 16/18/8 | 16/18/12 | 16/18/12 | 16/18/12 | 16/18/12 | 16/18/12 |
| Copolymer Moiety | Copolymer a | Solid Content (50%) AF-7 (50%) | 200.0 | 0.0 | 0.0 | 0.0 | 0.0 | 0.0 | 200.0 |
| | Copolymer b | | 0.0 | 200.0 | 0.0 | 0.0 | 0.0 | 0.0 | 0.0 |
| | Copolymer c | | 0.0 | 0.0 | 200.0 | 0.0 | 0.0 | 0.0 | 0.0 |
| | Copolymer d | | 0.0 | 0.0 | 0.0 | 200.0 | 0.0 | 0.0 | 0.0 |
| | Copolymer e | | 0.0 | 0.0 | 0.0 | 0.0 | 200.0 | 0.0 | 0.0 |
| | Copolymer f | | 0.0 | 0.0 | 0.0 | 0.0 | 0.0 | 200.0 | 0.0 |
| | Copolymer g | | 0.0 | 0.0 | 0.0 | 0.0 | 0.0 | 0.0 | 0.0 |
| | Copolymer h | | 0.0 | 0.0 | 0.0 | 0.0 | 0.0 | 0.0 | 0.0 |
| | Copolymer i | | 0.0 | 0.0 | 0.0 | 0.0 | 0.0 | 0.0 | 0.0 |
| | Copolymer j | | 0.0 | 0.0 | 0.0 | 0.0 | 0.0 | 0.0 | 0.0 |
| | Copolymer k | | 0.0 | 0.0 | 0.0 | 0.0 | 0.0 | 0.0 | 0.0 |
| | Copolymer l | | 0.0 | 0.0 | 0.0 | 0.0 | 0.0 | 0.0 | 0.0 |

-continued

| | | | | | | | | | |
|---|---|---|---|---|---|---|---|---|---|
| Urethane Group Moiety | Michael adduct (diethanolamine/2-ethylhexyl acrylate adduct) | | 4.0 | 4.0 | 4.0 | 4.0 | 4.0 | 4.0 | 4.0 |
| | Diethanolamine | | 2.8 | 2.8 | 0.7 | 2.8 | 2.8 | 2.8 | 0.6 |
| | Diisocyanate | | 7.8 | 7.8 | 4.1 | 7.8 | 7.8 | 7.8 | 3.7 |
| Diluting Agent | AF-7 | | 0.0 | 0.0 | 0.0 | 0.0 | 0.0 | 0.0 | 0.0 |
| | Hexyl Laurate | | 72.0 | 72.0 | 63.2 | 72.0 | 72.0 | 72.0 | 62.4 |
| | Total | | 286.6 | 286.6 | 272.0 | 286.6 | 286.6 | 286.6 | 270.7 |
| | Resin Solid Content | | 40.0 | 40.0 | 40.0 | 40.0 | 40.0 | 40.0 | 40.0 |
| | Copolymer/Urethane Group Mass Ratio | | 87/13 | 87/13 | 92/8 | 87/13 | 87/13 | 87/13 | 92/8 |

| | | | D8 | D9 | D10 | D11 | D12 | D13 | D14 |
|---|---|---|---|---|---|---|---|---|---|
| Long Chain Alkyl Groups (Carbon Numbers) | | | 16/18/12 | 12 | 8 | 22 | 6 | 16/18/12 | 16/18/12 |
| Copolymer Moiety | Copolymer a | Solid Content (50%) AF-7 (50%) | 200.0 | 0.0 | 0.0 | 0.0 | 0.0 | 0.0 | 0.0 |
| | Copolymer b | | 0.0 | 0.0 | 0.0 | 0.0 | 0.0 | 0.0 | 0.0 |
| | Copolymer c | | 0.0 | 0.0 | 0.0 | 0.0 | 0.0 | 0.0 | 0.0 |
| | Copolymer d | | 0.0 | 0.0 | 0.0 | 0.0 | 0.0 | 0.0 | 0.0 |
| | Copolymer e | | 0.0 | 0.0 | 0.0 | 0.0 | 0.0 | 0.0 | 0.0 |
| | Copolymer f | | 0.0 | 0.0 | 0.0 | 0.0 | 0.0 | 0.0 | 0.0 |
| | Copolymer g | | 0.0 | 0.0 | 0.0 | 200.0 | 0.0 | 0.0 | 0.0 |
| | Copolymer h | | 0.0 | 200.0 | 0.0 | 0.0 | 0.0 | 0.0 | 0.0 |
| | Copolymer i | | 0.0 | 0.0 | 200.0 | 0.0 | 0.0 | 0.0 | 0.0 |
| | Copolymer j | | 0.0 | 0.0 | 0.0 | 0.0 | 200.0 | 0.0 | 0.0 |
| | Copolymer k | | 0.0 | 0.0 | 0.0 | 0.0 | 0.0 | 200.0 | 0.0 |
| | Copolymer l | | 0.0 | 0.0 | 0.0 | 0.0 | 0.0 | 0.0 | 200.0 |
| Urethane Group Moiety | Michael adduct (diethanolamine/2-ethylhexyl acrylate adduct) | | 4.0 | 4.0 | 4.0 | 4.0 | 4.0 | 4.0 | 0.00 |
| | Diethanolamine | | 5.6 | 2.8 | 2.8 | 2.8 | 2.8 | 2.8 | 0.00 |
| | Diisocyanate | | 12.8 | 7.8 | 7.8 | 7.8 | 7.8 | 7.8 | 0.0 |
| Diluting Agent | AF-7 | | 14.4 | 0.0 | 0.0 | 0.0 | 0.0 | 0.0 | 0.0 |
| | Hexyl Laurate | | 84.0 | 72.0 | 72.0 | 72.0 | 72.0 | 72.0 | 50.0 |
| | Total | | 320.8 | 286.6 | 286.6 | 286.6 | 286.6 | 286.6 | 250.0 |
| | Resin Solid Content | | 40.0 | 40.0 | 40.0 | 40.0 | 40.0 | 40.0 | 40.0 |
| | Copolymer/Urethane Group Mass Ratio | | 82/18 | 87/13 | 87/13 | 87/13 | 87/13 | 87/13 | 100/0 |

(Preparation of Ink)

7.5 g of the obtained pigment dispersing agent D1, 5 g of pigment (Carbon Black MA11 by Mitsui Chemical Corporation), 6.25 g of AF-7 and 6.25 g of hexyl laurate were mixed, and zirconia beads (with a diameter of 0.5 mm) were placed in the mixture to disperse the mixture for 120 minutes using a rocking mill (by Seiwa Giken Co., Ltd.) After the dispersion, the zirconia beads were removed, and the mixture was filtered sequentially through a 3.0 μm membrane filter and a 0.8 μm membrane filter, to remove contamination and coarse particles. Thereafter, 12.5 g of AF-7 and 12.5 g of hexyl laurate were added to dilute the mixture, to obtain an ink of Example 1 in which pigment is dispersed.

Similarly, inks of other Examples and inks of comparative examples having the compositions shown in Table 3 were obtained in a similar manner as that described for the ink of Example 1.

The average dispersed particle size of the pigment and the ink viscosity of each of the obtained inks were measured. The average dispersed particle size of the pigment was measured using a dynamic light-scattering particle size distribution measuring device, LB-500, by HORIBA, Ltd. The ink viscosity was a viscosity under a shear stress of 10 Pa when the shear stress was increased from 0 Pa at a rate of 0.1 Pa/s at 23° C., and was measured using a stress-controlled rheometer, RS75 (with a cone angle of 1° and a diameter of 60 mm), by Haake. (Storage Stability of Ink (70° C.))

Each of the inks was placed in a sealed container, and left for four weeks at a temperature of 70° C. Thereafter, changes in the viscosity and the granularity of the ink were measured, and the results of measurement were evaluated in the following manner.

Rate of Viscosity/Granularity Change

[(Viscosity/Granularity after four weeks·100)/(Initial Viscosity/Granularity)]−100(%)

A: The rate of change of both the viscosity and the granularity were less than 5%;

B: The rate of change of one of the viscosity and the granularity was 5% or greater and less than 10%; and C: The rate of change of one of the viscosity and the granularity was greater than 10%.

(Print Density)

The obtained inks were charged in a printer, HC5500 (by Riso Kagaku Corporation), to print a solid image on plain paper (RISO printing paper (thin type), by Riso Kagaku Corporation). Then, OD values at the front and back sides of the resulting prints were measured using an optical densitometer (RD920, by Macbeth), and evaluated according to the following criteria. A higher front side OD value indicates higher image density, and a lower back side OD value indicates lower level of print bleed through.

Print Density (Front Side OD)

A: 1.10 or higher;
B: 1.05 through 1.09; and
C: 1.04 or lower.

Print Density (Back Side OD)

A: 0.25 or lower;
B: 0.26 through 0.30; and
C: 0.31 or higher.

(Low Temperature Adaptability)

Printing was performed onto A4 paper sheets with a printer, ORPHIS-X (by Riso Kagaku Corporation), under printing conditions of a head gap of 3 mm, an ambient temperature of 15° C., a printing speed of 120 ppm and a resolution of 300 dpi*300 dpi and 1-6 drop (6 picoliters per drop).

A: Almost no satellites (contamination of sheets by ink mist) were present, and image quality is favorable;

B: Some satellites were present, but image quality is of a level which is practically problem free; and C: A significant amount of satellites were present, and image quality is of a level not suited for practical use.

(Adsorption Rate of Pigment Dispersing Agent)

The obtained inks underwent centrifugal separation at 50000 G for six hours, using centrifugal separator H2000B (by Kokusan K. K.), to obtain supernatants and precipitates. The heating residues of the pigment dispersing agents that were not adsorbed to the pigment in the supernatants were quantified by differential thermal scale TG-DTA Thermo Plus TG8120 (by Rigaku Corporation), and the percentages of the dispersing agents that adsorbed to the pigment were calculated.

The results of the evaluations described above are shown along with the formulations of the inks in Table 3.

TABLE 3

|  |  | Examples |  |  |  |  |  |  |  |  |  |  |  | Comparative Examples |  |  |  |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 1 | 2 | 3 | 4 |
| Pigment | Carbon Black MA100 (Mitsubishi Chemical) | 5 | 5 | 5 | 5 | 5 | 5 | 5 | 5 | 5 | 5 | 5 | 5 | 5 | 5 | 5 | 5 |
| Pigment Dispersing Agent | Pigment Dispersant D1 Solid Content (40%) | 7.5 |  |  |  |  |  |  |  |  |  | 7.5 | 7.5 |  |  |  |  |
|  | Pigment Dispersant D2 |  | 7.5 |  |  |  |  |  |  |  |  |  |  |  |  |  |  |
|  | Pigment Dispersant D3 |  |  | 7.5 |  |  |  |  |  |  |  |  |  |  |  |  |  |
|  | Pigment Dispersant D4 |  |  |  | 7.5 |  |  |  |  |  |  |  |  |  |  |  |  |
|  | Pigment Dispersant D5 |  |  |  |  | 7.5 |  |  |  |  |  |  |  |  |  |  |  |
|  | Pigment Dispersant D6 |  |  |  |  |  | 7.5 |  |  |  |  |  |  |  |  |  |  |
|  | Pigment Dispersant D7 |  |  |  |  |  |  | 7.5 |  |  |  |  |  |  |  |  |  |
|  | Pigment Dispersant D8 |  |  |  |  |  |  |  | 7.5 |  |  |  |  |  |  |  |  |
|  | Pigment Dispersant D9 |  |  |  |  |  |  |  |  | 7.5 |  |  |  |  |  |  |  |
|  | Pigment Dispersant D10 |  |  |  |  |  |  |  |  |  | 7.5 |  |  |  |  |  |  |
|  | Pigment Dispersant D11 |  |  |  |  |  |  |  |  |  |  |  |  | 7.5 |  |  |  |
|  | Pigment Dispersant D12 |  |  |  |  |  |  |  |  |  |  |  |  |  | 7.5 |  |  |
|  | Pigment Dispersant D13 |  |  |  |  |  |  |  |  |  |  |  |  |  |  | 7.5 |  |
|  | Pigment Dispersant D14 |  |  |  |  |  |  |  |  |  |  |  |  |  |  |  | 7.5 |
| Dispersion Diluent | AF-7 | 6.25 | 6.25 | 6.25 | 6.25 | 6.25 | 6.25 | 6.25 | 6.25 | 6.25 | 6.25 | 6.25 | 12.5 | 6.25 | 6.25 | 6.25 | 6.25 |
|  | Hexyl Laurate | 6.25 | 6.25 | 6.25 | 6.25 | 6.25 | 6.25 | 6.25 | 6.25 | 6.25 | 6.25 | 6.25 | 0 | 6.25 | 6.25 | 6.25 | 6.25 |
| Viscosity Adjusting Solvent | AF-7 | 12.5 | 12.5 | 12.5 | 12.5 | 12.5 | 12.5 | 12.5 | 12.5 | 12.5 | 12.5 | 25 | 25 | 12.5 | 12.5 | 12.5 | 12.5 |
|  | Hexyl Laurate | 12.5 | 12.5 | 12.5 | 12.5 | 12.5 | 12.5 | 12.5 | 12.5 | 12.5 | 12.5 | 0 | 0 | 12.5 | 12.5 | 12.5 | 12.5 |
|  | Total | 50 | 50 | 50 | 50 | 50 | 50 | 50 | 50 | 50 | 50 | 50 | 50 | 50 | 50 | 50 | 50 |
|  | Hydrocarbon Based Solvent within Total Amount of Solvent (%) | 55 | 55 | 55 | 55 | 55 | 55 | 55 | 55 | 55 | 55 | 85 | 100 | 55 | 55 | 55 | 55 |
| Properties | Mean Dispersed Particle Size (nm) | 86 | 96 | 86 | 89 | 94 | 92 | 90 | 82 | 91 | 94 | 84 | 87 | 107 | 168 | 88 | 123 |
|  | Viscosity (mPa·s) | 9.8 | 9.9 | 10.3 | 10.4 | 10.2 | 9.6 | 10.6 | 11.1 | 10.3 | 11.2 | 9.5 | 9.1 | 12.9 | 13.9 | 13.8 | 15.1 |

TABLE 3-continued

| | | Examples | | | | | | | | | | | | Comparative Examples | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 | 4 |
| Evaluations | Print Density (Front OD) | A | A | A | A | A | A | A | A | A | A | A | A | A | B | B | B |
| | Print Density (Back OD) | A | A | A | A | A | A | A | A | A | A | A | A | A | B | C | C |
| | Storage Stability | A | A | B | A | A | A | A | A | A | B | A | A | A | C | B | C |
| | Low Temperature Adaptability | A | A | A | A | A | A | A | A | A | A | A | A | C | C | B | C |
| | Adsorption Rate of Pigment Dispersant to Pigment (%) | 73 | 68 | 64 | 72 | 71 | 69 | 66 | 63 | 68 | 61 | 78 | 82 | 55 | 42 | 50 | 28 |

As shown in Table 3, the obtained inks of Examples 1 through 12 all have viscosities and average dispersed pigment particle sizes within a suitable range for an ink jet ink. The inks of Examples 1 through 12 are superior in low temperature adaptability and storage stability, and it can be seen that these inks capable of suppressing print bleed through and realizing high print density. Note that the percentages of the hydrocarbon solvent with respect to the total amount of solvent are 85% and 100% in Examples 11 and 12, respectively, which are higher percentages than those of the other Examples. In these cases, the adsorption rates of the pigment dispersing agent to pigment were high. From this fact, it can be understood that it is more favorable for the pigment dispersing agent of the present invention to have a higher content of the hydrocarbon based non polar solvent. Further, it will become possible to reduce the amount of the pigment dispersing agent. Such a reduction will lead to a decrease in the viscosity of the ink, and even more superior low temperature adaptability can be achieved.

The carbon number of the alkyl groups that constitute the side chains is 22 in the ink of Comparative Example 1, which is long. Therefore, the non-aqueous resin became likely to solidify at low temperatures, thereby leading to a deterioration in low temperature adaptability, although storage stability was secured. Inversely, the carbon number of the alkyl groups that constitute the side chains is 6 in the ink of Comparative Example 2, which is short. Therefore, the solubility of the non-aqueous resin in the solvent was poor and the pigment dispersing ability also became poor. Accordingly, the average dispersed pigment particle size and the ink viscosity become high. For this reason, neither low temperature adaptability nor storage stability was obtained, and print bleed through could not be suppressed because adsorption of pigment was poor, leading to a deterioration in print density as well.

The ink of Comparative Example 3 did not include the monomer (C). in this case, the viscosity of the ink increased, neither low temperature adaptability nor storage stability was obtained, and print bleed through could not be suppressed because adsorption of pigment was poor, leading to a deterioration in print density as well. The ink of Comparative Example 4 does not have urethane groups, and therefore pigment adsorbing properties could not be obtained. As a result, dispersion of the pigment was suppressed, the average dispersed pigment particle size became large, and the viscosity of the ink also increased. For this reason, increases in viscosity became significant at low temperatures, leading to both poor low temperature adaptability and poor storage stability. In addition, print bleed through could not be suppressed because adsorption of pigment was poor, leading to a deterioration in print density as well.

The invention claimed is:

1. A non-aqueous pigment ink comprising a pigment, a non-aqueous solvent, and a non-aqueous resin that is in a dissolved state in the non-aqueous solvent and has a pigment dispersing ability;
the non-aqueous solvent including a hydrocarbon based non-polar solvent at 50% by mass or more with respect to the total amount of solvent;
the non-aqueous resin being an acrylic series polymer having a comb shaped structure and including, on a (meth)acrylate main chain, a side chain including an alkyl group, the alkyl group having a carbon number within a range from 8 to 18, and a side chain including an urethane group;
the acrylic series polymer being a polymer obtained by, into a copolymer of a monomer mixture of an alkyl (meth)acrylate (A) having an alkyl group with a carbon number within a range from 8 to 18, a reactive (meth)acrylate (B) having a functional group capable of reacting with an amino group, and a monomer (C) having a β-diketone group or a β-keto acid ester group, introducing the urethane group by reactions between the functional group capable of reaction with an amino group, an amino alcohol, and a multivalent isocyanate compound; and
the mass ratio between the copolymer moiety and the urethane group moiety in the acrylic series polymer being within a range from 80:20 to 99:1.

2. The non-aqueous pigment ink as defined in claim 1, wherein the non-aqueous solvent includes the hydrocarbon based non polar solvent at 70% by mass or greater with respect to the total amount of solvent.

3. The non-aqueous pigment ink as defined in claim 1, wherein the mass ratio between the copolymer moiety and the urethane group moiety in the acrylic series polymer is within a range from 85:15 to 95:5.

4. The non-aqueous pigment ink as defined in claim 3, wherein the non-aqueous solvent includes the hydrocarbon based non-polar solvent at 70% by mass or greater with respect to the total amount of solvent.

5. The non-aqueous pigment ink as defined in claim 1, wherein the side chain including an alkyl group has a carbon number of the alkyl group within a range from 12 to 18.

6. The non-aqueous pigment ink as defined in claim 5, wherein the non-aqueous solvent includes the hydrocarbon based non-polar solvent at 70% by mass or greater with respect to the total amount of solvent.

7. The non-aqueous pigment ink as defined in claim 5, wherein the mass ratio between the copolymer moiety and the urethane group moiety in the acrylic series polymer is within a range from 85:15 to 95:5.

8. The non-aqueous pigment ink as defined in claim 7, wherein the non-aqueous solvent includes the hydrocarbon based non-polar solvent at 70% by mass or greater with respect to the total amount of solvent.

* * * * *